United States Patent
Akasaka et al.

[11] Patent Number: 6,004,675
[45] Date of Patent: Dec. 21, 1999

[54] OPTICAL GLASS FIBER

[75] Inventors: Nobuhiro Akasaka; Tatsuya Kakuta; Kohei Kobayashi; Yasuo Matsuda, all of Yakohama; Shigeru Tomita, Mito, all of Japan

[73] Assignees: Sumitomo Electric Industries, Ltd., Osaka; Nippon Telegraph & Telephone Corp., Tokyo, both of Japan

[21] Appl. No.: 07/937,953

[22] Filed: Sep. 1, 1992

[30] Foreign Application Priority Data

Sep. 3, 1991 [JP] Japan .................................. 3-222639

[51] Int. Cl.⁶ ...................................................... D02G 3/00
[52] U.S. Cl. ......................... 428/375; 428/392; 428/384; 385/127; 385/128; 385/144
[58] Field of Search .................... 428/375, 392, 428/384; 385/123, 127, 128, 144

[56] References Cited

U.S. PATENT DOCUMENTS

| | | | |
|---|---|---|---|
| 4,271,229 | 6/1981 | Temple | 428/392 |
| 4,608,409 | 8/1986 | Coady et al. | 428/392 |
| 4,738,509 | 4/1988 | Broer et al. | 428/392 |
| 4,741,958 | 5/1988 | Bishop | 428/392 |

FOREIGN PATENT DOCUMENTS

| | | | |
|---|---|---|---|
| 1269260 | 1/1985 | Canada . | |
| 101588 | 9/1987 | European Pat. Off. | 385/128 |
| 108160 | 10/1987 | European Pat. Off. | 385/128 |
| 054451 | 8/1989 | European Pat. Off. | 385/128 |
| 0405549 | 1/1991 | European Pat. Off. . | |
| 167730 | 11/1982 | Japan | 385/128 |
| 150468 | 10/1983 | Japan | 385/128 |
| 150469 | 10/1983 | Japan | 385/128 |
| 025252 | 5/1984 | Japan | 385/128 |
| 62-54206 | 3/1987 | Japan . | |
| 62-95510 | 5/1987 | Japan . | |
| 197301 | 11/1987 | Japan | 385/128 |
| 63-107845 | 4/1988 | Japan . | |
| 032273 | 6/1988 | Japan | 385/128 |
| 63-168608 | 7/1988 | Japan . | |
| 189809 | 11/1988 | Japan | 385/128 |
| 2096353 | 10/1982 | United Kingdom | 385/127 |
| 2204050 | 11/1988 | United Kingdom | 385/128 |
| 9103499 | 3/1991 | WIPO | 428/392 |

*Primary Examiner*—Merrick Dixon
*Attorney, Agent, or Firm*—Pillsbury, Madison & Sutro, LLP

[57] ABSTRACT

A coated glass fiber for light transmission consisting of a glass fiber for light transmission and at least one coating layer made of a UV-curing resin, wherein an outermost layer of the coating layer is made of a UV-curing resin having a Young's modulus of at least 100 kg/mm² and a change of a cure shrinkage degree of 1% or less after a Young's modulus reaches one tenth of an end Young's modulus, which has good lateral pressure characteristics and low transmission loss.

5 Claims, 2 Drawing Sheets

OPTICAL GLASS FIBER

BACKGROUND OF THE INVENTION

1. Field of the Invention

The present invention relates to a glass fiber for light transmission. More particularly, the present invention relates to an optical glass fiber having good lateral pressure characteristics and transmission properties.

2. Description of the Related Art

As shown in FIG. 1, a glass fiber for light transmission, namely an optical glass fiber has at least one coating layer around the fiber since it is difficult to maintain a mechanical strength and a transmission characteristics of a bare glass fiber in an as-drawn state. In general, the coating layer around the optical glass fiber 1 has a two-layer structure comprising an inner buffer layer 2 made of a comparatively soft material and an outer protective layer 3 made of a comparatively rigid material.

When a UV-curing resin is used as a resin for coating the optical glass fiber, a volume of the coating layer shrinks as the resin is cured after coating. Due to the volume shrinkage, the resin of the coating layer shrinks in a radial direction and a longitudinal direction of the glass fiber to generate strain in the glass fiber. When a resin having a large modulus is used for the formation of the protective layer, the strain in the glass fiber is considerable and light transmission loss increases. Such strain is one of problems which arise when a modulus of a coating material is increased. In particular, the strain generated by the coating layer is a big problem in maintaining lateral pressure characteristics since reduction of a diameter of an optical glass fiber is required to increase a density of a cable.

When an external pressure is applied to the optical glass fiber in a lateral direction, for example, when the optical glass fiber is wound around a bobbin, microbends are formed on the optical glass fiber and, as a result, light transmission loss increases. Such properties are referred to as "lateral pressure characteristics".

SUMMARY OF THE INVENTION

One object of the present invention is to provide an optical glass fiber which solves problems caused by the volume shrinkage of the coating layer due to resin curing.

Another object of the present invention is to provide an optical glass fiber which has a small diameter and maintains lateral pressure characteristics when it is used in a high density cable.

According to the present invention, there is provided a coated glass fiber for light transmission comprising a glass fiber for light transmission and at least one coating layer made of a UV-curing resin, wherein an outermost layer of the coating layer is made of a UV-curing resin having a Young's modulus of at least 100 kg/mm² and a change of a cure shrinkage degree of 1% or less after a Young's modulus reaches one tenth of an end Young's modulus.

DETAILED DESCRIPTION OF THE INVENTION

Herein, the end Young's modulus is defined as follows:

When a UV-curing resin is irradiated with UV light for a unit period of time in a unit area, a curing reaction proceeds in accordance with an exposed dose. The end Young's modulus is a Young's modulus of the cured resin at the completion of the curing reaction.

The cure shrinkage degree herein used is defined by the equation:

$$\text{Cure shrinkage degree} = [(d_s - d_t)/d_s] \times 100 (\%)$$

wherein $d_t$ is a specific gravity of an uncured liquid resin and $d_s$ is a specific gravity of a cured resin. The cure shrinkage degree varies as the curing reaction proceeds. A cure shrinkage degree at the completion of the curing reaction is referred to as an end cure shrinkage degree.

One percent or less of the change of the cure shrinkage degree means that a difference of the cure shrinkage degree between a certain point during curing and the completion of the curing reaction is 1% or less. In the present invention, the change of the cure shrinkage degree is within 1%, preferably within 0.8%, between a time at which the Young's modulus is one tenth (1/10) of the end Young's modulus and the completion of the curing reaction.

Hitherto, it has been expected that the light transmission loss of the optical glass fiber would increase as a shrinkage stress increases. In general, the shrinkage stress is expressed by a product of the Young's modulus, the cure shrinkage degree and the cross sectional area of the coating layer.

In the actual cure of the resin, the Young's modulus and the shrinkage during curing of resin vary with time and the shrinkage stress near the end of the curing at which the modulus increases will have a greatest influence on the transmission characteristics of the optical glass fiber. Therefore, when the UV-curing resin of the coating layer satisfies the Young's modulus and the change of the cure shrinkage degree as defined by the present invention, the light transmission loss is decreased.

As the UV-curing resin which can be used according to the present invention, any UV-curing resin which has the above properties may be used. Examples of the UV-curing resins are UV-curing urethane-acrylate resins, UV-curing epoxy-acrylate resins, UV-curable silicone-acrylate resins.

The coated optical glass fiber of the present invention may be produced by a conventional method except the selection of the UV-curing resin.

PREFERRED EMBODIMENTS OF THE INVENTION

EXAMPLE

Figure 1:
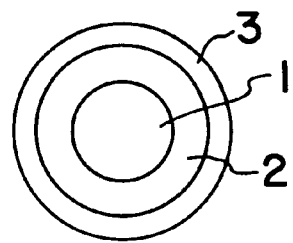
FIG. 1 is a cross sectional view of an optical glass fiber having a buffer layer and a protective layer, FIG. 2 schematically shows an apparatus for producing a coated optical glass fiber.
Figure 2:
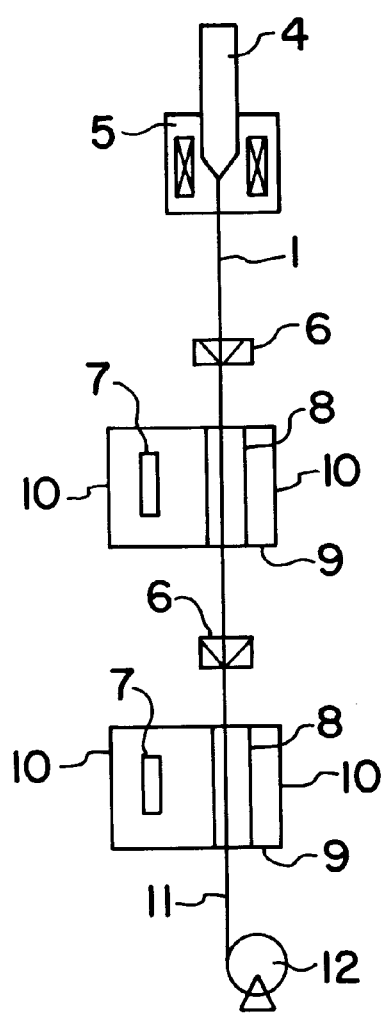

Using an apparatus shown in FIG. 2, a bare optical glass fiber 1 having a diameter of 125 μm was fabricated by drawing a preform 4 in a fiber-drawing furnace 5. Around the bare optical glass fiber, UV-curing resins were coated by a pair of resin coaters 6 and cured in UV-light irradiation apparatuses 9 successively to obtain an optical glass fiber 11 coated by two layers of the UV-curing resin as shown in FIG. 1.

Each irradiation apparatus 9 comprises a UV lamp 7, a cylinder 8 through which the optical fiber passes, and a reflector 10. The coated optical glass fiber was wound by a winder 12.

To form an inner (buffer) layer 2, a UV-curing urethane-acrylate resin having an end Young's modulus of 0.1 kg/mm$^2$ at room temperature was used commonly. An outer diameter of the inner layer was 200 μm. To form an outer (protective) layer, a UV-curing urethane-acrylate resin having a different end Young's modulus as shown in the Table was used. An outer diameter of the outer layer was 250 μm.

By the above manner, fiber coated optical glass fibers A to E were produced.

The lateral pressure characteristics and the transmission property of each of the coated optical glass fibers A to E were measured. The results are shown in the Table.

TABLE

| Fiber No. | End Young's modulus of a resin for outer layer $E_0$ (kg/mm$^2$) | End cure shrinkage degree $\epsilon_0$ (%) | Shrinkage degree at $\frac{1}{10} E_0$ $\epsilon'$ (%) | Change of cure shrinkage degree $\epsilon_0 - \epsilon'$ (%) | Transmission loss in a bundle state at 1.55 μm (dB/km) | Transmission loss when wound around a bobbin under tension of 100 g at 1.55 μm (dB/km) |
|---|---|---|---|---|---|---|
| A | 80 | 5.4 | 3.6 | 1.8 | 0.21 | 0.32 |
| B | 100 | 5.8 | 4.0 | 1.8 | 0.27 | 0.28 |
| C | 100 | 5.8 | 5.0 | 0.8 | 0.21 | 0.22 |
| D | 150 | 6.2 | 4.5 | 1.7 | 0.30 | 0.34 |
| E | 150 | 6.0 | 5.3 | 0.7 | 0.22 | 0.22 |

The transmission loss in a bundle state in the Table represents a transmission loss caused by the shrinkage stress of the resin with no lateral pressure on the fibers.

The transmission loss when wound around a bobbin under tension of 100 g in the Table depends on the lateral pressure characteristics of the fibers.

Figure 3:
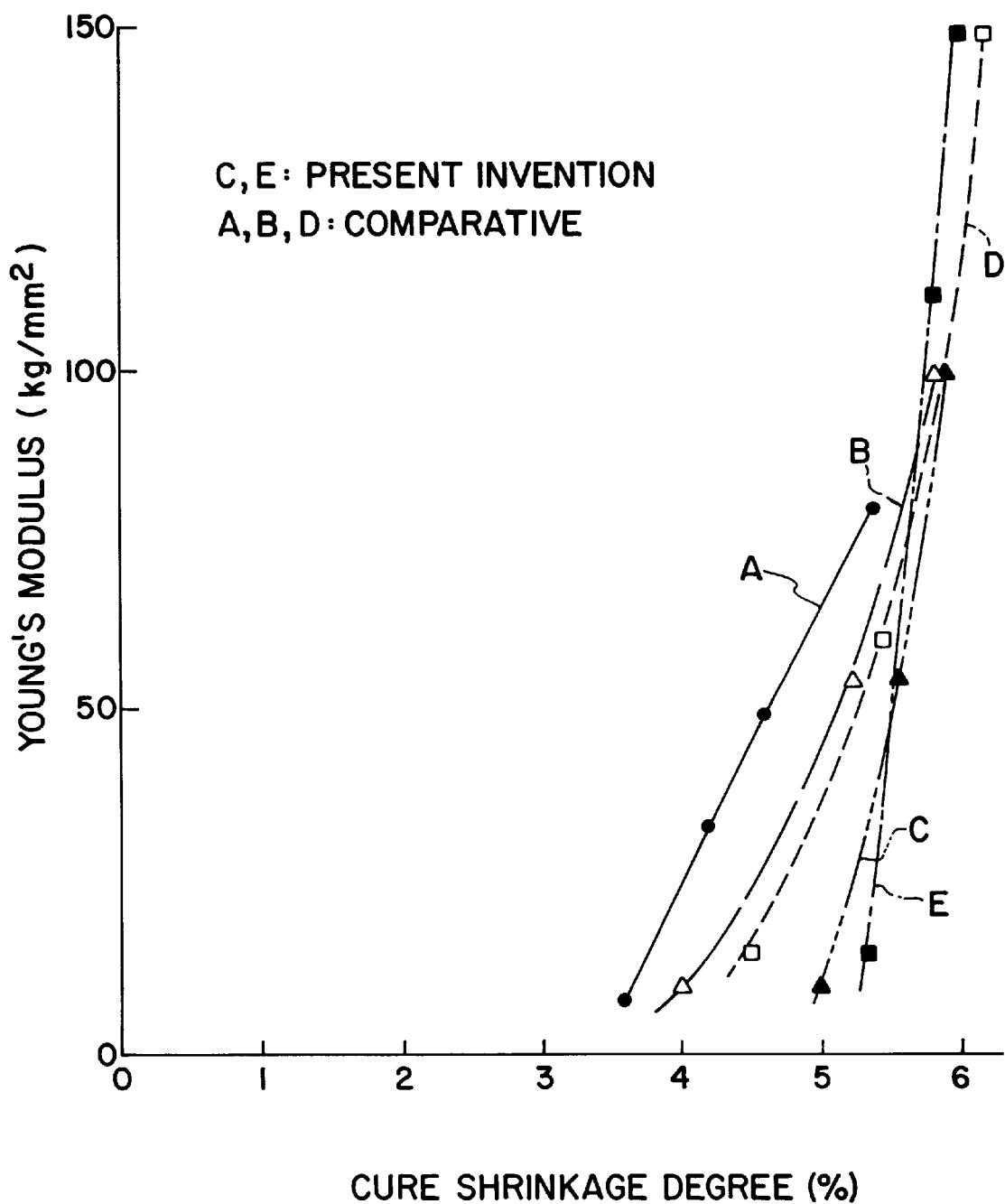
FIG. 3 is a graph showing a relationship between Young's modulus and a cure shrinkage degree.

FIG. 3 shows a relationship between the Young's modulus and the cure shrinkage degree of the resin forming the outer layer. The resin which did not reach the end cure shrinkage was prepared by curing the resin at a very low dose of the UV light.

From the results in the Table and FIG. 3, it is understood that when the Young's modulus is at least 100 kg/mm$^2$, preferably at least 150 kg/mm$^2$ and a change of a cure shrinkage degree is 1% or less, preferably 0.8% or less after a Young's modulus reaches one tenth of an end Young's modulus (the fibers C and E), the fiber has good lateral pressure characteristics.

In a case where the coating layer has more than two layers, the effects of the present invention are achieved insofar as at least the outermost layer satisfies the requirements for the Young's modulus.

What is claimed is:

1. A coated glass fiber for light transmission comprising:
   a glass fiber for light transmission; and
   an outermost layer comprising a UV-curing resin having a Young's modulus of at least 100 kg/mm$_2$ and a change of cure shrinkage degree of 1% or less after a Young's modulus reaches one tenth of an end Young's modulus.

2. The coated glass fiber according to claim 1, wherein said UV-curing resin is a UV-curing urethane-acrylate resin.

3. The coated glass fiber according to claim 1, wherein the UV-curing resin has a Young's modulus of at least 150 kg/mm$^2$.

4. The coated glass fiber according to claim 1, wherein the UV-curing agent is selected from the group consisting of UV-curing urethane-acrylate resins, UV-curing epoxy-acrylate resins, and UV-curable silicone-acrylate resins.

5. The coated glass fiber according to claim 1, further comprising a buffer layer comprising a UV-curing resin disposed between the glass fiber and the outermost layer.

* * * * *